United States Patent [19]

Anderson

[11] Patent Number: 5,613,719
[45] Date of Patent: Mar. 25, 1997

[54] HANGER FOR FIXING AN OBJECT IN AN ELEVATED POSITION

[76] Inventor: Russell Anderson, 18 Crestshire Dr., Lawrence, Mass. 01843

[21] Appl. No.: 428,907

[22] Filed: Apr. 25, 1995

[51] Int. Cl.⁶ ............................................. A47G 1/16
[52] U.S. Cl. ...................... 294/19.1; 294/85; 248/340
[58] Field of Search ..................... 294/19.1, 24, 85; 248/339, 340, 343, 544

[56] References Cited

U.S. PATENT DOCUMENTS

| | | | |
|---|---|---|---|
| 510,053 | 12/1893 | Smith et al. | 294/19.1 |
| 3,038,752 | 6/1962 | Bergman | 294/19.1 |
| 3,561,718 | 2/1971 | Iverson | 294/19.1 |
| 4,068,817 | 1/1978 | Berger | 248/340 |
| 4,269,087 | 5/1981 | Wand | 294/19.1 |
| 4,296,959 | 10/1981 | Helbig | 248/340 |
| 5,181,683 | 1/1993 | Smith | 248/339 |

FOREIGN PATENT DOCUMENTS 537581   5/1959   Belgium .................... 294/19.1

*Primary Examiner*—Dean Kramer
*Attorney, Agent, or Firm*—Lorusso & Loud

[57] ABSTRACT

A hanger for hanging an object in an elevated position. The hanger includes a receptacle fixed on its shaft for receiving an extension implement such as a broom handle. In the preferred embodiment, the receptacle is a loop formed integrally from the material of the hanger. The extension implement is inserted into the receptacle and the hanger is lifted to the elevated position for fastening. The receptacle may take a variety of shapes and sizes, and may be fixed at any position on the hanger.

2 Claims, 6 Drawing Sheets

HANGER FOR FIXING AN OBJECT IN AN ELEVATED POSITION

FIELD OF THE INVENTION

The present invention relates to a hanger for fixing an object from an elevated position. The invention is particularly useful in connection with hanging retail merchandise or bird feeders.

BACKGROUND OF THE INVENTION

Presently, known methods for fastening objects such as retail merchandise, signs, bird feeders, etc. to an elevated position requires use of a ladder or other implement to reach the position from which the object is to hang. In the case of retail merchandise for example, a fastening clip is typically attached to the device to be hung. A person must then climb a ladder and fasten the object, via the clip, to the top of a partition wall, peg board, curtain rod, or other elevated structure. Where it is desired to hang several objects in a large area, it is necessary to move the ladder from place to place and repeatedly climb the ladder to hang the object.

Similarly, when a person wishes to hang a bird feeder from a tree limb, it is often necessary to climb ladder to the reach an appropriate area of the limb for hanging the feeder. If the feeder is dislodged from the tree, by the weather for example, the person must retrieve the ladder to replace the feeder.

Constantly retrieving and climbing a ladder for such a simple task, however, is time consuming and generally annoying. Moreover, since a ladder is not always readily available, resort is often made to other objects which are not designed for climbing and, therefore, present a dangerous condition. Thus, there is common need for an implement which will allow the hanging of items such as retail merchandise, bird feeder, signs, etc., from an elevated position without the use of a ladder or other implement which must be used to reach that position.

OBJECT OF THE INVENTION

Accordingly, it is an object of the present invention to provide a hanger which allows the fastening of an object to an elevated position without the use of a ladder.

This and other objects of the present invention will become apparent from a view of the detailed description provided below in connection with the drawings.

SUMMARY OF THE INVENTION

The present invention relates to a hanger for hanging an object in an elevated position. The hanger includes a shaft, and a receptacle formed on the shaft. The receptacle is adapted to receive an extension implement to allow extension of the hanger to an elevated position for fastening the hanger to the elevated position. Preferably, the receptacle is formed integrally from the material of the hanger, and is in the shape of a loop formed in perpendicular axial alignment with the shaft. The receptacle may also be conically or cylindrically shaped or take the form of a projection formed on the shaft, and may be slidably movable along the shaft. In addition, the receptacle may take the form of a spring clamp with a dimple for receiving the extension implement, or may be in the form of a receptacle hook formed on the end of a fastening hook.

BRIEF DESCRIPTION OF THE DRAWING

A preferred embodiment of the invention is described below with reference to the following figures wherein like numerals represent like parts.

DETAILED DESCRIPTION OF THE INVENTION

Figure 1:
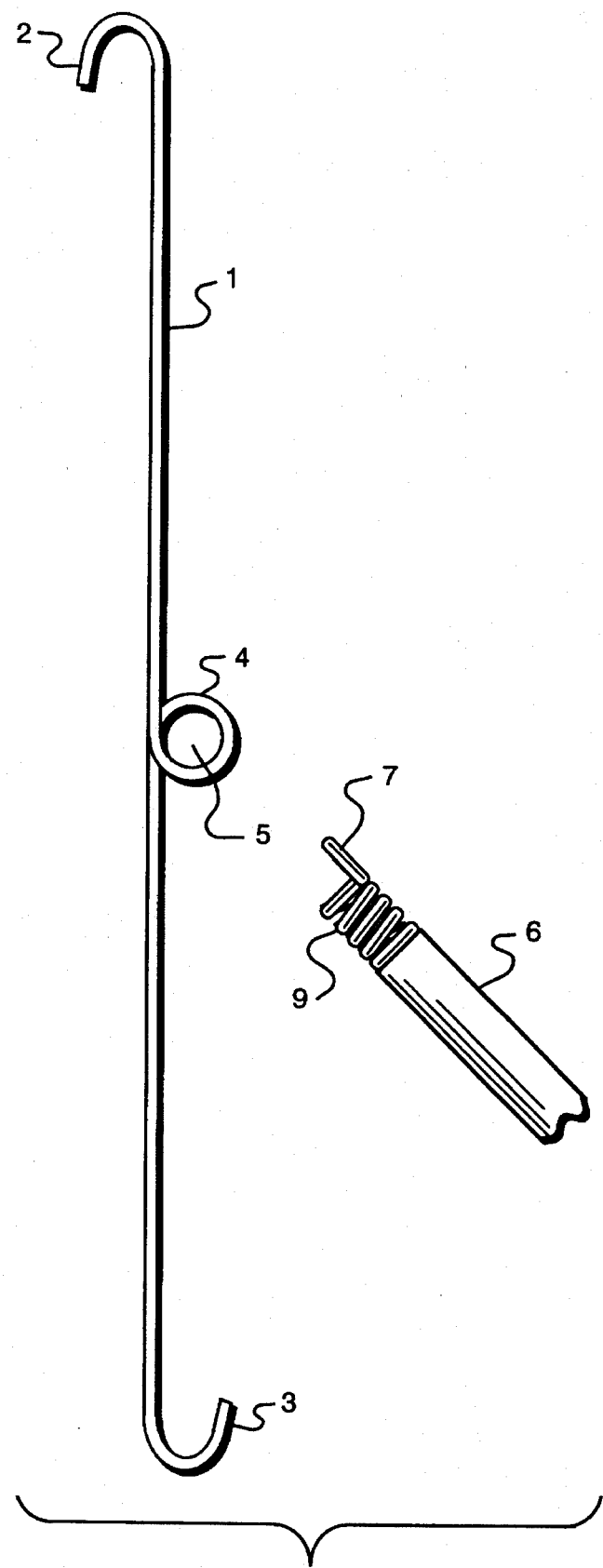
FIG. 1 is a side view of one embodiment of a hanger according to the present invention having a loop-shaped receptacle.

FIG. 1 shows a side view of a hanger according to the present invention. The hanger includes a shaft 1 with a first fastening hook 2 and a second fastening hook 3. The length of the shaft and size of the fastening hooks may vary according to the desired use of the hanger.

Along the length of the shaft a receptacle 4 is formed. As shown in FIG. 1, in a preferred embodiment the receptacle is shaped as a loop having its axis substantially perpendicular to the axis of the shaft 1, and formed integrally from the material of the shaft. The receptacle 4 is adapted to receive an extension implement 6 such as a broom handle, small stick, etc.

In operation, a portion of the extension implement 6 is placed into the opening 5 of the receptacle 4 and the hanger is lifted into the elevated position. In the preferred embodiment, as shown in FIG. 1, the end of the implement is fitted with a spring 9 with an extending hook 7. The extending hook 7 fits into the opening 5 of the receptacle 4, to allow the hanger to be raised to the elevated position, and the spring 9 dampens the forces on the hanger and the implement during operation. Once in the elevated position, the first hook 1 is fastened to the desired position and the extension implement is removed from the receptacle.

The embodiment of FIG. 1 provides a significant advantage regarding ease of manufacturing. To wit, the hanger is formed with a unitary construction by appropriately bending the material of the hanger into the described shape. Preferably the hanger is formed of aluminum or other metallic material. It is also possible, however, to form the hanger from a plastic material by injection molding.

Figure 2:
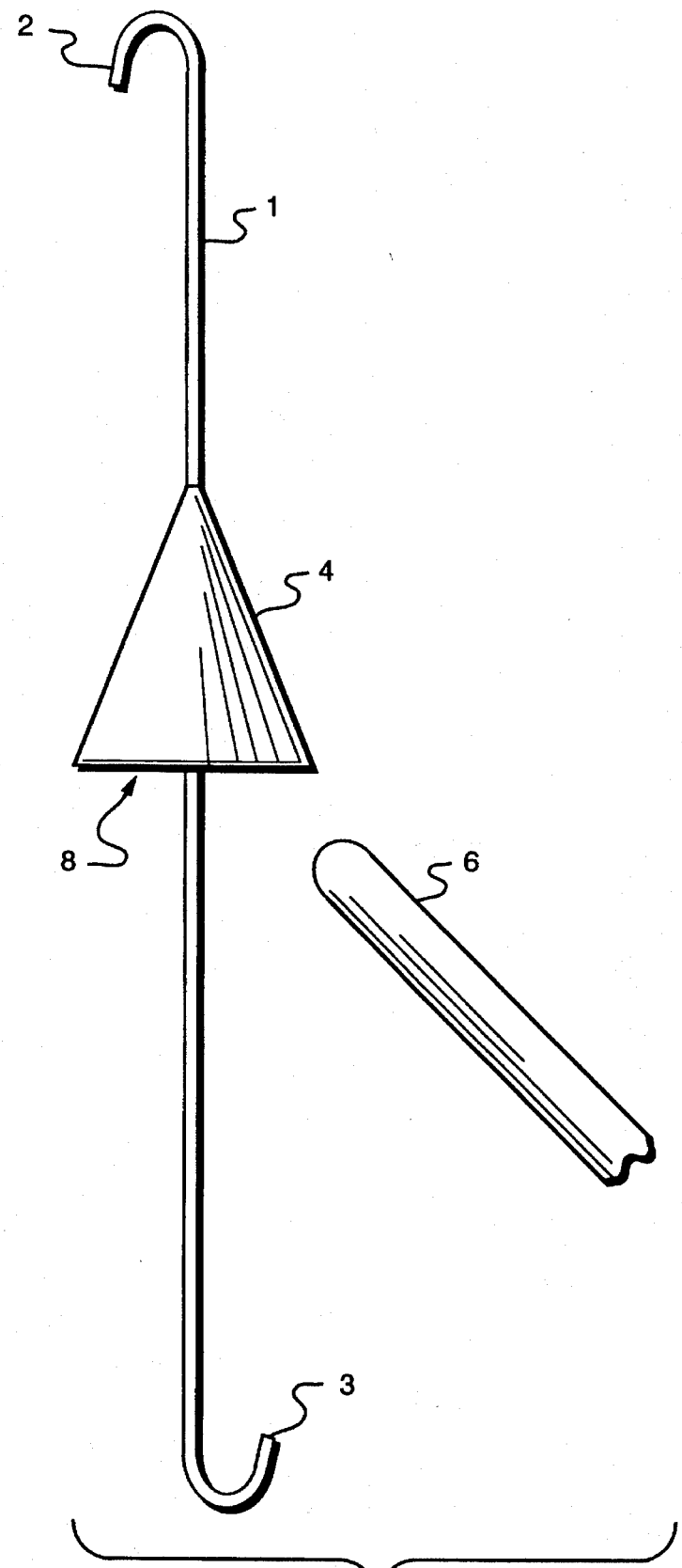
FIG. 2 is a side view of a second embodiment of a hanger according to the present invention having a conically shaped receptacle.

Turning to FIG. 2, a second preferred embodiment of the present invention is shown wherein the receptacle is formed with a conical shape and fixed to the shaft 1 with an open end 8 in axial alignment with the shaft. The extension implement is inserted into the opening 8 and the hanger is fastened to an elevated position as described above. Although FIG. 2 shows the receptacle 4 fastened through its center to the shaft, it is also possible to fasten the exterior surface of the receptacle to the shaft by spot-welding or other means.

Advantageously, the construction of FIG. 2 obviates the need for an extension implement having a hooked end as in FIG. 1. Instead, the implement is received by the conical inner surface of the receptacle. Thus, the end of the extension implement may vary in size and shape as long as it fits within the opening 8 of the receptacle.

Figure 3:
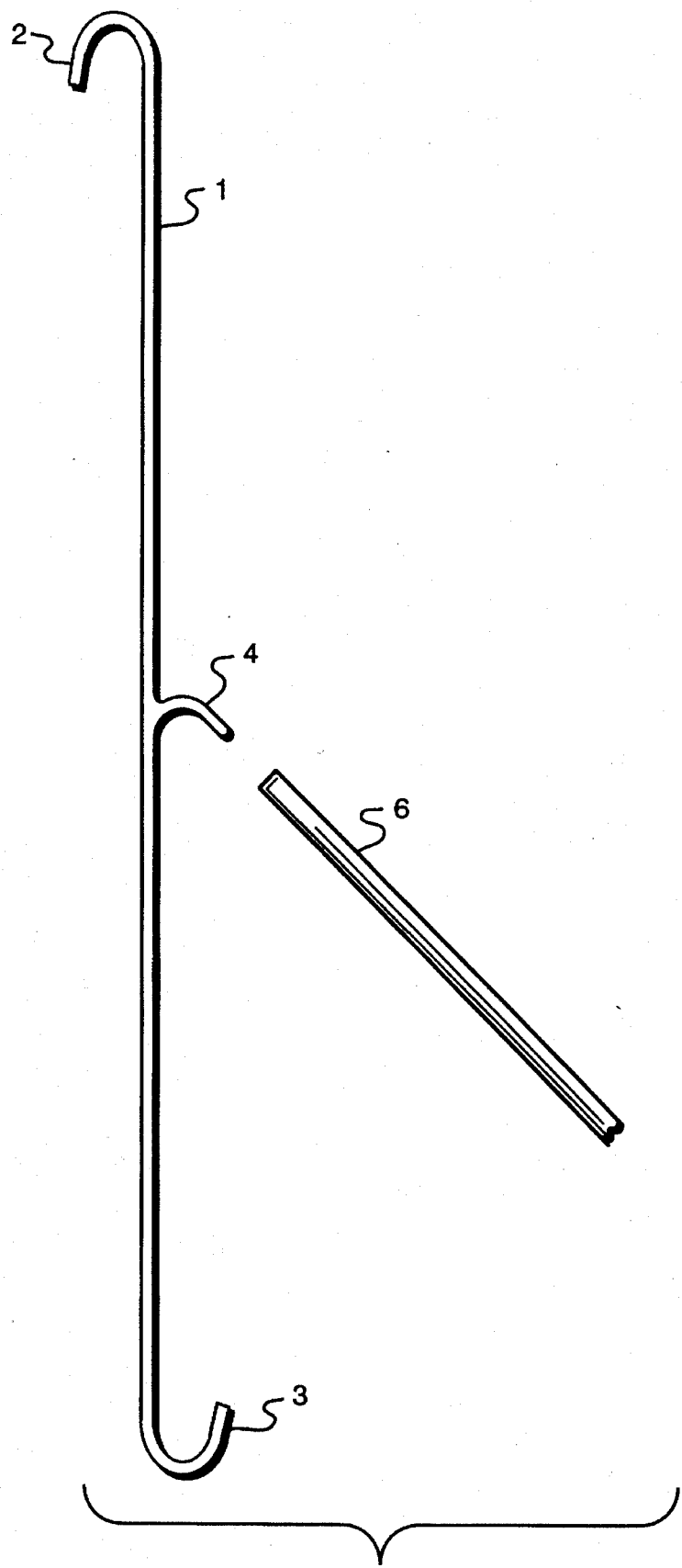
FIG. 3 is a side view of a hanger according to the present invention having a receptacle in the form of a projection.

Turning to FIG. 3, the receptacle 4 may also take the form of a projection formed on the shaft 1. In this embodiment, the end of extension implement is chosen or adapted to have a tubular construction. In operation, receptacle is received inside of the end of the extension implement to raise the hanger into position.

Figure 4:
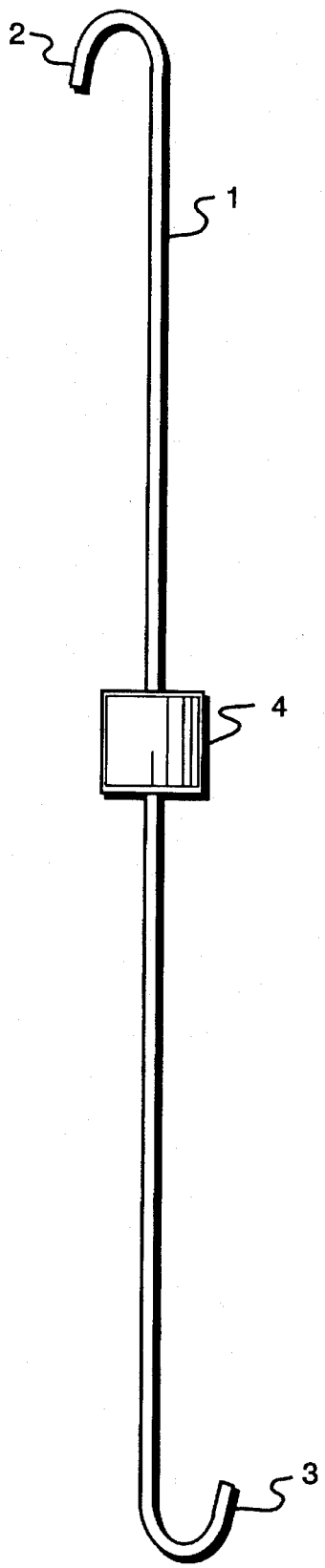
FIG. 4 is a side view of a hanger according to the present invention having a cylindrical receptacle fixed concentric with the shaft of the hanger.

Another embodiment of the present invention includes a cylindrical receptacle, as shown in FIG. 4. The cylindrical receptacle 4 may take the form of a collar fixed concentric with the shaft and slidably movable along the length of the shaft. The receptacle may also be fastened to the shaft by its exterior surface. In this embodiment, the extension implement may be chosen or adapted to fit within the inner surface of the receptacle or clamp to the exterior surface of the receptacle.

Figure 5:
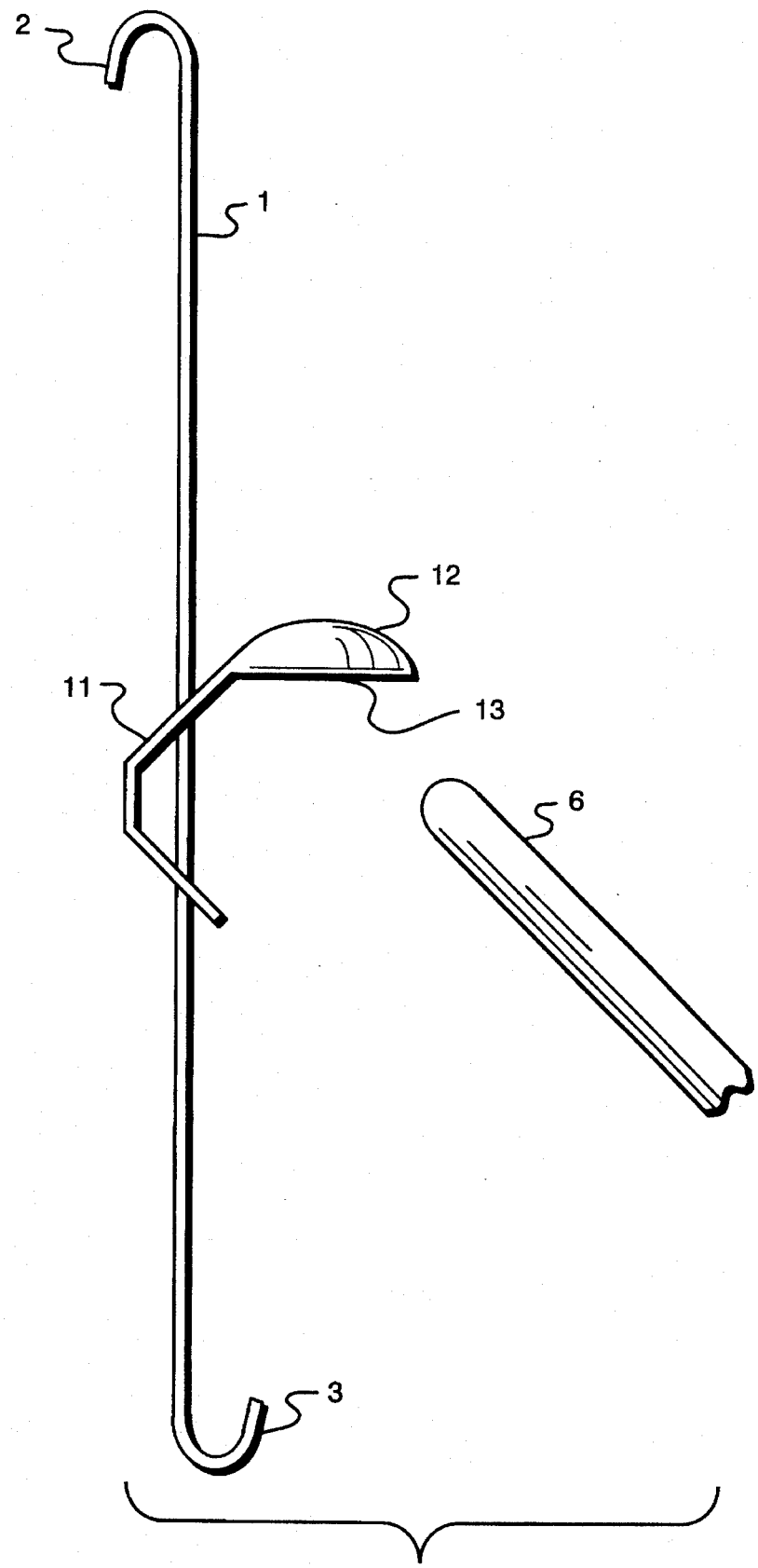
FIG. 5 is a side view of a hanger according to the present invention having a spring clamp receptacle.

Referring now to FIG. 5, the receptacle may also be in the form of a spring clamp 11 fastened to said shaft and having a dimpled end 12 for receiving the extension implement. The spring clamp is preferably spot welded to the shaft 1, and the dimpled end 12 is provided with a spherical inner surface 13 for receiving the extension implement. This embodiment, like that of FIG. 1, provides a significant advantage in terms of ease of manufacture since the hanger is of unitary construction.

Figure 6:
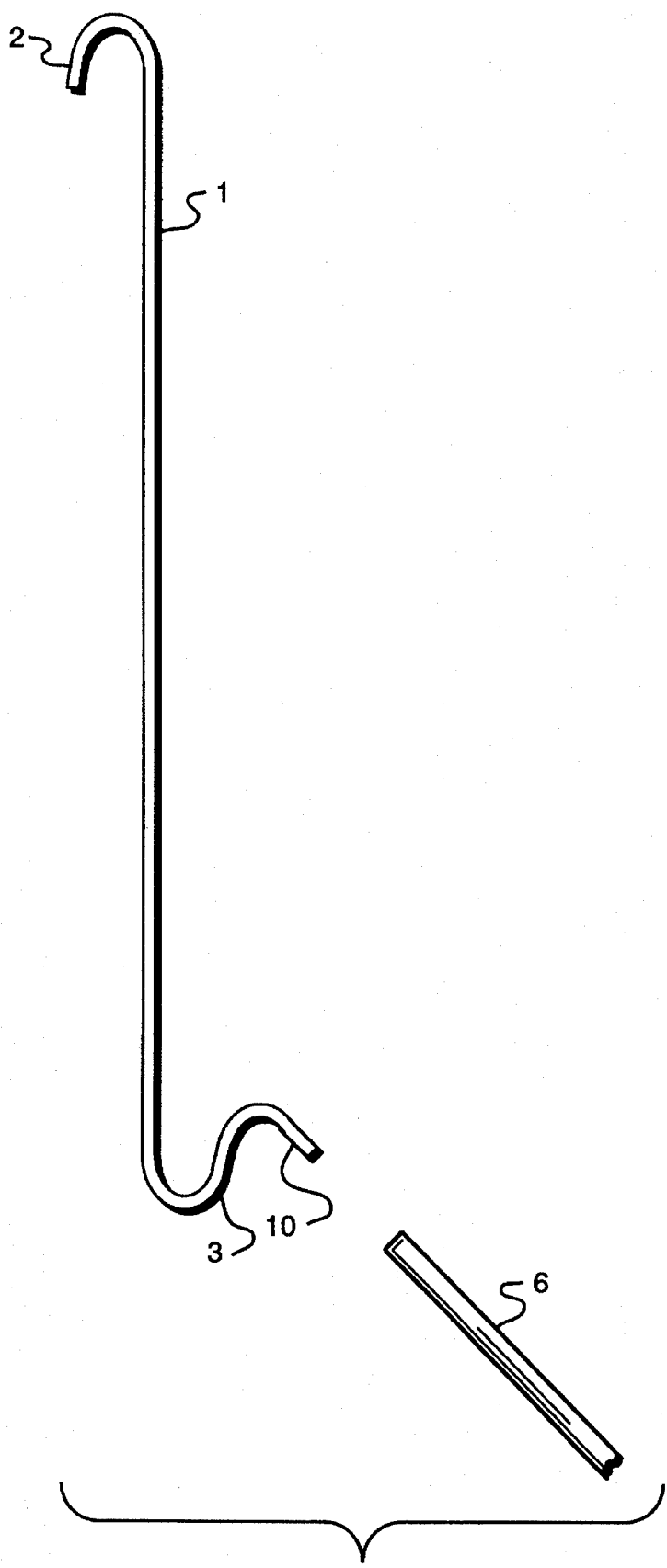
FIG. 6 is a side view of a hanger according to the present invention having a receptacle hook formed on the end of the second fastening hook.

Yet another embodiment of the present invention is depicted in FIG. 6. Here, the receptacle is formed by creating a receptacle hook 10 on the end of the second fastening hook 3. As in the embodiment of FIG. 3, the end of extension implement is chosen or adapted to have a tubular construction, and the receptacle is received inside the end of the extension implement to raise the hanger into position.

The embodiments which have been described herein are but some of the several which utilize this invention and are set forth here by way of illustration but not of limitation. It is obvious that many other embodiments which will be readily apparent to those skilled in the art may be made without departing materially from the spirit and scope of this invention. For example, the receptacle can take a variety of shapes and sizes as long as it has an open end which will receive an appropriate extension implement.

What is claimed is:

1. A hanger for hanging an object in an elevated position comprising:

a shaft;

a receptacle formed on said shaft and integrally from the material of said shaft, said receptacle being in the shape of a loop formed in perpendicular axial alignment with said shaft, and being adapted to receive an extension implement to allow extension of said hanger to an elevated position for fastening said hanger to said elevated position; and first and second fastening hooks on said shaft, said first fastening hook being adapted to fasten said hanger to said elevated position, said second fastening hook being adapted to receive said object, wherein said receptacle is formed centrally on said shaft so that said receptacle is approximately equidistant from said first and second fastening hooks.

2. A method of hanging an object in an elevated position comprising:

providing a hanger, said hanger comprising a shaft;

a receptacle formed on said shaft and integrally from the material of said shaft, said receptacle being in the shape of a loop formed in perpendicular axial alignment with said shaft, and being adapted to receive an extension implement to allow extension of said hanger to an elevated position for fastening said hanger to said elevated position; and first and second fastening hooks on said shaft, said first fastening hook being adapted to fasten said hanger to said elevated position, said second fastening hook being adapted to receive said object, wherein said receptacle is formed centrally on said shaft so that said receptacle is approximately equidistant from said first and second fastening hooks;

hanging said object on said second fastening hook;

inserting said extension implement into said receptacle;

elevating said hanger into said elevated position using said extension implement; and fastening said first fastening hook to said elevated position.

* * * * *